United States Patent [19]

Irwin

[11] Patent Number: 4,899,414
[45] Date of Patent: Feb. 13, 1990

[54] POLISHED SURFACE PROTECTIVE SLEEVE FOR COVERING THE ELECTRICAL CORD OF A CAR WAX POLISHING AND BUFFING MACHINE

[76] Inventor: James K. Irwin, 6880 Barker Way, San Diego, Calif. 92119

[21] Appl. No.: 245,560

[22] Filed: Sep. 19, 1988

[51] Int. Cl.⁴ .................. A47L 25/00; H01B 7/24; B24B 29/02
[52] U.S. Cl. .................. 15/97 B; 15/97 R; 15/257 R; 138/110; 138/126; 138/128; 150/165; 174/136; 428/36.1; 428/36.8; 428/36.91; 428/100; 428/102
[58] Field of Search ............ 428/36.1, 36.91, 36.8, 428/100, 102; 138/126, 128, 110; 174/68.3, 136; 150/52 M; 15/97 B, 97 R, 257 R

[56] References Cited

U.S. PATENT DOCUMENTS

| | | | |
|---|---|---|---|
| 1,620,933 | 3/1926 | Wilcox | 174/136 |
| 2,121,963 | 2/1937 | Goit | 428/36.1 |
| 2,187,391 | 2/1937 | Borgeson | 174/121 R |
| 2,408,253 | 8/1943 | Diebold | 138/128 |
| 3,370,818 | 6/1966 | Perr | 428/100 |
| 3,638,649 | 2/1972 | Ersek | 138/177 |
| 4,006,756 | 2/1977 | Gerigk et al. | 138/118.1 |
| 4,018,983 | 4/1977 | Pedlow | 138/177 |
| 4,084,065 | 4/1978 | Swenson | 174/42 |
| 4,179,950 | 12/1979 | Valley | 150/52 M |
| 4,323,610 | 4/1982 | Leverich | 428/36.1 |

Primary Examiner—Ellis P. Robinson
Assistant Examiner—Archene A. Turner
Attorney, Agent, or Firm—Charles C. Logan, II

[57] ABSTRACT

A polished surface protective sleeve that is used for covering the electrical cord of a car wax polishing and buffing machine. The protective sleeve is formed of an elongated tubular member having an internal diameter greater than the outside diameter of the electrical cord. The outer surface of the tubular member is entirely covered by a layer of soft unabrasive material. The protective sleeve has been designed to eliminate the situation when the electrical cord is dragged across a polished car surface while buffing an adjacent area.

1 Claim, 1 Drawing Sheet

POLISHED SURFACE PROTECTIVE SLEEVE FOR COVERING THE ELECTRICAL CORD OF A CAR WAX POLISHING AND BUFFING MACHINE

BACKGROUND OF THE INVENTION

The invention relates to a car wax polishing and buffing machine and more specifically to a protective sleeve that is slipped over the electrical cord of the machine.

A common problem that exists while waxing and buffing an automobile with a car wax polishing and buffing machine results from the electrical cord being dragged across an already polished surface. This results in the necessity of having to rebuff the marred surface area.

It is an object of the invention to provide a novel polished surface protective sleeve that will prevent the previous problem of marring a polished surface due to the electrical cord of the car wax polishing and buffing machine being dragged thereacross.

It is also an object of the invention to provide a novel polished surface protective sleeve that is easily installed and removed from the electrical cord of a car wax polishing and buffing machine.

It is another object of the invention to provide a novel polished surface protective sleeve for covering the electrical cord of a car wax polishing and buffing machine that is economical to manufacture and market.

SUMMARY OF THE INVENTION

Applicant's novel polished surface protective sleeve has been designed for covering the electrical cord of a car wax polishing and buffing machine. Its installation is simple and merely requires the protective sleeve to slide over the electrical cord of the car wax polishing and buffing machine. The protective sleeve may take different forms and in one of these, the tubular member is formed of rubber tubing having an axially extending slit along its entire length. The outer surface of this rubber tubing would have a tubular layer of soft fabric material adhered to its outer surface and it would have a mating axially extending slit.

A second embodiment of the polished surface protective sleeve would be fabricated from a strip of material whose opposite lateral edges have been folded over toward each other and stitched together thus forming a radially inwardly extending tab. In this version, a ring of hook and loop fastening material would be attached to the inner surface of one end of the protective sleeve and a mating ring of hook and loop material would be adhered to the outer surface of the tubular sleeve extending from the housing of the car wax polishing and buffing machine and through which the electrical cord would travel on its way to the interior of the housing of the machine.

It is important that the material that covers the outer surface of the protective sleeve be fabricated of a material which is soft and unabrasive and preferably washable. An example of such a material would be wool or material of comparable texture. The texture of the material would be such that it would be soft and crushable.

DESCRIPTION OF THE PREFERRED EMBODIMENT

Figure 1:
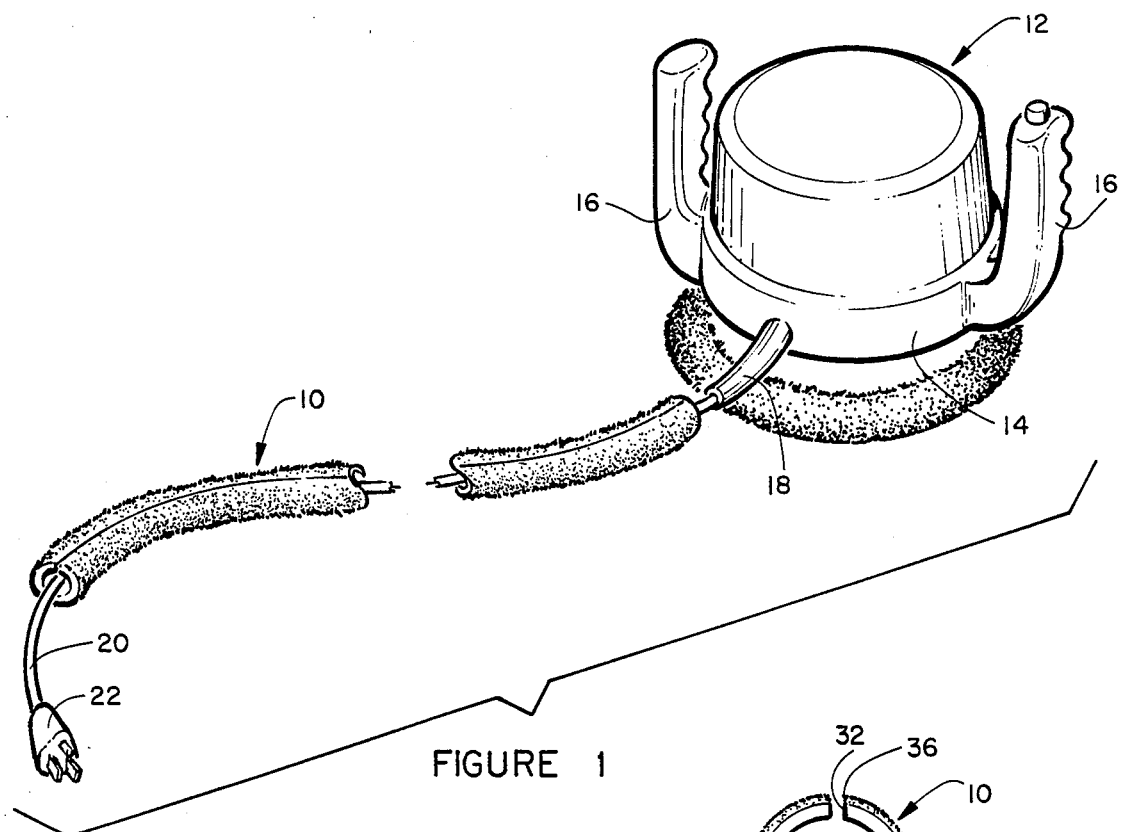
FIG. 1 is a perspective view illustrating the novel polished surface protective sleeve installed on the electrical cord of a car wax polishing and buffing machine.
Figure 2:
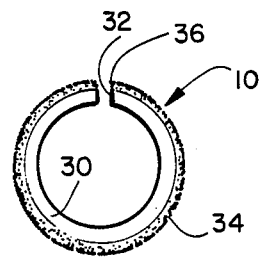
FIG. 2 is an end elevation view of the polished surface protective sleeve.
Figure 3:
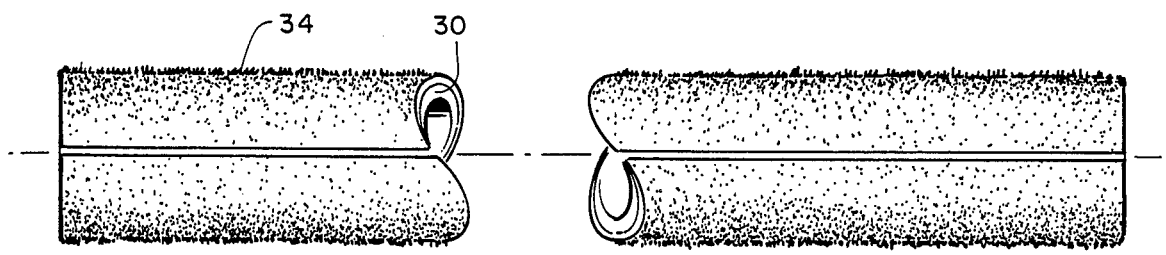
FIG. 3 is a top plan view of the polished surface protective sleeve.

Applicant's novel polished surface protective sleeve will now be described by referring to FIGS. 1-5 of the drawing. The protective sleeve is generally designated numeral 10.

Car wax polishing and buffing machine 12 has a housing 14 with a pair of handles 16 extending laterally therefrom. A tubular sleeve 18 extends from housing 14 and through its interior passes an electrical cord 20 having a three-conductor plug 22 at its ends.

Protective sleeve 10 is formed from an elongated tubular member 30 of rubber tubing having a slit 32 extending its entire length. A tubular layer of soft fabric 34 is adhered to the outer surface of tubular member 30 and it has a slit 36 that extends its entire length.

Figure 4:
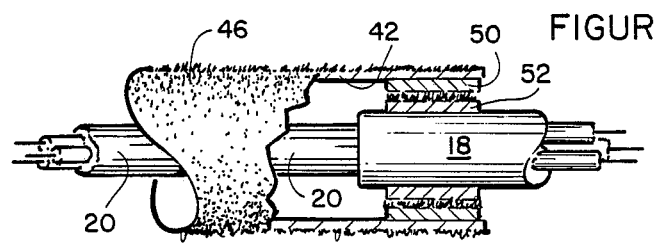
FIG. 4 is a partial top plan view of a first alternative polished surface protective sleeve installed on the car wax polishing and buffing machine with portions broken away for clarity.
Figure 5:
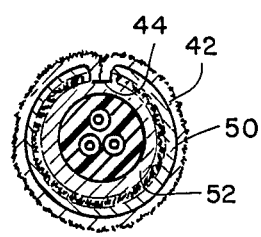
FIG. 5 is an end elevation view of the first alternative embodiment of the polished surface protective sleeve.

A first alternative protective sleeve 40 is illustrated in FIGS. 4 and 5. It has a tubular member formed from an elongated strip of material such as lambswool or the equivalant and it has its opposite lateral edges folded over and stitched together forming a tab 44. The outer surface of tubular member 42 would be fabric 46 which is soft and crushable. A ring of hook and loop fastening material 50 is attached to the inner surface of one end of protective sleeve 40. A ring 52 of hook and loop fastening material would also be adhered to the outer surface of tubular sleeve 18.

What is claimed is:

1. The combination of a car wax polishing and buffing machine and a polished surface protective sleeve comprising:

said car wax polishing and buffing machine having an elongated electrical cord having a plug on one end, said electrical cord having a predetermined outside diameter;

an elongated tubular member having a predetermined length and a predetermined internal diameter, the internal diameter of said tubular member being greater than the outside diameter of said electrical cord, said tubular member having a first end and a second end, said electrical cord being inserted into said tubular member and passing through its entire length, said tubular member having an outer surface that is nonabrasive so it won't mar a polished paint surface;

said tubular member being made of an elongated strip of fabric whose opposite lateral edges have been folded over toward each other and stitched together thus forming a radially inwardly extending tab; and the first end of said tubular member having a strip of hook and loop fastening material attached to its inner surface and it mates with a ring of hook and loop fastening material that has been secured to structure of said electrical cord.

* * * * *